US012319435B2

(12) United States Patent
Walter et al.

(10) Patent No.: US 12,319,435 B2
(45) Date of Patent: Jun. 3, 2025

(54) METHOD FOR PILOTING AN AIRCRAFT

(71) Applicants: SAFRAN ELECTRONICS & DEFENSE, Paris (FR); ST ENGINEERING AEROSPACE Ltd, Singapore (SG)

(72) Inventors: Eric Walter, Paris (FR); Julien Farjon, Paris (FR); Mikaël Diaz, Paris (FR); Nicolas Cadalen, Paris (FR); Philippe Tranie, Paris (FR); Ng Kwee Chye, Singapore (SG); Hoon Ta Huang Jackson, Singapore (SG)

(73) Assignees: SAFRAN ELECTRONICS & DEFENSE, Boulogne-Billancourt (FR); ST ENGINEERING AEROSPACE LTD, Singapore (SG)

( * ) Notice: Subject to any disclaimer, the term of this patent is extended or adjusted under 35 U.S.C. 154(b) by 740 days.

(21) Appl. No.: 17/415,482

(22) PCT Filed: Dec. 19, 2019

(86) PCT No.: PCT/EP2019/086273
§ 371 (c)(1),
(2) Date: Jun. 17, 2021

(87) PCT Pub. No.: WO2020/127706
PCT Pub. Date: Jun. 25, 2020

(65) Prior Publication Data
US 2022/0063836 A1  Mar. 3, 2022

(30) Foreign Application Priority Data

Dec. 19, 2018 (FR) ...................................... 1873405
Feb. 6, 2019 (FR) ...................................... 1901190
(Continued)

(51) Int. Cl.
*B64D 45/00* (2006.01)
*G05D 1/00* (2024.01)

(52) U.S. Cl.
CPC ..... *B64D 45/0034* (2019.08); *B64D 45/0053* (2019.08); *B64D 45/0056* (2019.08); *G05D 1/0033* (2013.01)

(58) Field of Classification Search
CPC ............ B64D 45/0034; B64D 45/0053; B64D 45/0056; G05D 1/0033; B64C 13/20; B64C 13/18; B64C 13/22
See application file for complete search history.

(56) References Cited

U.S. PATENT DOCUMENTS 6,198,989 B1 * 3/2001 Tankhilevich .......... G01S 19/43
701/2
2003/0093187 A1 * 5/2003 Walker ............... B64D 45/0059
701/1
(Continued)

FOREIGN PATENT DOCUMENTS

EP 1450227 A2 8/2004
EP 3121121 A1 1/2017
(Continued)

OTHER PUBLICATIONS

Barbara Peterson; "Two People in a Cockpit Isn't Enough: What We Need to Prevent Future Air Disasters"; www.popularmechanics.com; Apr. 1, 2015; pp. 2-3.
(Continued)

Primary Examiner — Hunter B Lonsberry
Assistant Examiner — Jalal C Coduroglu
(74) Attorney, Agent, or Firm — Muncy, Geissler, Olds & Lowe, P.C.

(57) ABSTRACT

A method for piloting a pre-existing aircraft comprising the following steps:
(Continued)

integrating an alternative piloting system (1) into the pre-existing aircraft;

connecting the aircraft (200) and a ground station in which a ground pilot (207) is positioned;

when the aircraft is in a normal state, having the aircraft piloted by a nominal crew;

using detection means to detect the occurrence of an emergency situation and, when the occurrence of the emergency is detected:

making the ground pilot (207) operational, so that the ground pilot can produce an aircraft ground piloting set-point;

transmitting the ground piloting setpoint to the aircraft;

using the alternative piloting system to acquire and transmit the ground piloting setpoint to the aircraft flight control system.

9 Claims, 10 Drawing Sheets

(30) Foreign Application Priority Data

Feb. 6, 2019 (FR) .......................................... 1901191
Feb. 8, 2019 (FR) .......................................... 1901254

(56) References Cited

U.S. PATENT DOCUMENTS

| 2006/0167598 | A1* | 7/2006 | Pennarola | H04B 7/18506 244/75.1 |
| 2009/0105891 | A1* | 4/2009 | Jones | B64D 45/0031 701/2 |
| 2010/0004801 | A1* | 1/2010 | Flotte | G05D 1/0646 701/8 |
| 2012/0241563 | A1* | 9/2012 | Chaduc | B64C 27/58 244/196 |
| 2012/0253560 | A1* | 10/2012 | Corpron | B64D 35/04 701/3 |
| 2016/0185448 | A1* | 6/2016 | Scacchi | B64C 13/22 244/197 |
| 2017/0213467 | A1* | 7/2017 | Loussides | G08G 5/02 |
| 2017/0329349 | A1* | 11/2017 | Greenfield | B64C 13/0421 |
| 2018/0170524 | A1* | 6/2018 | Blanc | G05D 1/0858 |
| 2018/0180444 | A1* | 6/2018 | Cantaloube | G06F 3/0488 |
| 2018/0290729 | A1* | 10/2018 | Shavit | G08G 5/0056 |
| 2019/0090800 | A1* | 3/2019 | Bosworth | A61B 5/0015 |
| 2019/0315462 | A1* | 10/2019 | Skladman | B64D 3/02 |

FOREIGN PATENT DOCUMENTS

| GB | 2381879 A | 5/2003 |
| RO | 126349 B1 * | 1/2021 |

OTHER PUBLICATIONS

Yixiang Lim et al.; "Commercial airline single-pilot operations: System design and pathways to certification"; IEEE Aerospace and Electronic Systems Magazine.; Jul. 1, 2017; pp. 4-21; vol. 32, No. 7.

* cited by examiner

METHOD FOR PILOTING AN AIRCRAFT

The invention relates to the field of methods for piloting an aircraft.

BACKGROUND OF THE INVENTION

Modern airliners are generally piloted by a crew of at least two pilots, including a captain and a co-pilot. It is envisaged to fly some of these airliners with only one pilot on board for very specific applications, and in particular to transport goods. It is planned to convert an Airbus A321 airliner into a cargo aircraft that can be piloted by a single pilot.

This reconfiguration of the passenger aircraft has many advantages.

By transforming a pre-existing airliner that has been piloting for several years into a cargo aircraft, we have a proven, reliable cargo aircraft, without the need to finance a complete new aircraft development program. The profitability of the initial program is also improved with this new application.

Since a cargo plane does not carry passengers, unlike a commercial aircraft, reducing the number of pilots seems to be an easier first step for the general public to accept. Of course, it is not a question of accepting any reduction in flight safety, which must not be degraded but rather reinforced by this reconfiguration. Nor can an overload of work be accepted for the only pilot on board.

By reducing the number of pilots, the overall cost of each flight is also reduced.

In addition, a number of solutions have emerged to assist the pilot on board in his/her tasks, including improving safety through the ability to analyze a large amount of data in real time. Solutions also exist to assist the pilot on board when conditions in the cockpit are deteriorated, for example in the event of smoke being released in the cockpit.

However, this reconfiguration of the passenger aircraft also faces a number of challenges.

The current architecture of many transport aircraft is based on the assumption of a two-pilot crew. A two-pilot crew makes it possible to compensate for the failure of one of the pilots in critical flight phases. A crew of two pilots also makes it possible to maintain a bearable work-load for each pilot in the event of an abnormal situation, for example in the event of an engine failure, or during critical flight phases (take-off, landing).

In addition, conventional automatic control systems do not cover all the flight phases. During certain flight phases, the aircraft must be manually operated by a pilot. Thus, with a single pilot, a pilot failure during these flight phases becomes a major failure leading to a catastrophic event, which is not acceptable.

The reduction in the number of pilots therefore requires the development and integration of a number of additional safety and automation functions in the aircraft.

Additional safety functions include ensuring that the air-craft remains perfectly safe to fly even in the event of a failure of the automatic flight control system or the in-ability of the single pilot to fly the aircraft manually.

The additional safety functions must also make it possible to prevent or at least limit the consequences of a malicious act carried out by the pilot, such as a deliberate crash of the aircraft into infrastructures or inhabited areas.

Of course, for the conversion of a pre-existing passenger aircraft into a cargo aircraft to be economically attractive, these additional safety functions must be integrated into pre-existing aircraft by requiring limited additional certification activities.

Purpose of the Invention

The purpose of the invention is to safely and inexpensively convert a traditional pre-existing aircraft into an air-craft that can be piloted by a single pilot.

SUMMARY OF THE INVENTION

To achieve this goal, a method for piloting a pre-existing aircraft is proposed, the aircraft having original systems including an automatic flight control system and a flight control system, the method for piloting an aircraft including the steps of:
  integrating an alternative piloting system into the pre-existing aircraft;
  connecting, through a command and flight control system (system C2), the aircraft and a ground station in which a ground pilot is positioned;
  when the aircraft is in a normal state, having the air-craft piloted by a nominal crew consisting of a single pilot on board the aircraft, the alternative piloting system and the automatic flight control system, which are integrated into the aircraft;
  using detection means to detect the occurrence of a particular emergency situation that may affect the operation of the aircraft and, when the occurrence of the particular emergency situation is detected:
  making the ground pilot operational, so that the ground pilot can produce an aircraft ground piloting setpoint;
  transmitting the ground piloting setpoint to the aircraft using a system data link C2;
  using the alternative piloting system to acquire and transmit the ground piloting setpoint to the aircraft flight control system, so that the aircraft is piloted by an alternative crew including the alternative piloting system, the automatic flight control system and the ground pilot.

Thus, when the aircraft is in a normal state, or in an abnormal but non-emergency state, the only pilot on board is assisted by the alternative piloting system. Piloting the aircraft is carried out by the pilot on board, the alternative piloting system and the automatic flight control system, i.e. in a piloting configuration very close to that of a conventional aircraft (except that the copilot is the alternative piloting system and is therefore virtual and not human).

In the event of a particular emergency situation, the alternative crew replaces the nominal crew. The alternative crew includes the ground pilot, the alternative piloting system, the automatic control system, and the pilot on board. The latter is possibly (but not necessarily) relieved of any flight control action.

The aircraft is therefore operated in a perfectly safe manner.

Indeed, in the event of the incapacity of the pilot on board, the aircraft is piloted by the alternative crew. In addition, in the event that the emergency situation is a failure of an aircraft system (e. g. an engine), the pilot on board is assisted by the other actors of the alternative crew (and then also belongs to the alternative crew) and can therefore contribute to securing the aircraft without extra work for the pilot.

The implementation of this method for piloting a pre-existing aircraft is relatively inexpensive. The method for piloting an aircraft requires the integration, in the pre-existing aircraft, of the alternative piloting system, the system C2, the detection means, the processing means and the activation means. These means are integrated into the pre-existing aircraft without modifying the original systems of the pre-existing aircraft. There is therefore no need to redo the certification activities of the original systems, which reduces the cost of integration.

In addition, a method for piloting an aircraft such as the one described above is proposed, in which the ground pilot is made operational by a ground supervisor who is in charge of supervising a plurality of aircrafts.

In addition, a method for piloting an aircraft such as the one described above is proposed, including the step of informing the ground supervisor of the occurrence of the particular emergency situation using the system data link(s) C2.

In addition, a method for piloting an aircraft such as the one described above is proposed, in which at least one primary data link and one secondary data link of the system C2 are used, the secondary data link allowing the primary data link to be redundant and the primary data link to be supplemented in the event of its loss.

In addition, a method for piloting an aircraft such as the one described above is proposed, in which, depending on the current flight phase of the aircraft, the primary data link is an LOS link and the secondary data link is a BLOS link, or the primary data link is a BLOS link and the secondary data link is an LOS link, or the primary data link is a first BLOS link and the secondary data link is a second BLOS link.

In addition, a method for piloting an aircraft such as the one described above is proposed, in which the particular emergency situation belongs to a predefined list of emergency situations, which includes incapacity of the pilot on board, a risk of malicious act by the pilot on board and an engine failure.

In addition, a method for piloting an aircraft such as the one described above is proposed, in which the detection means includes a voice assistance system used to detect a level of stress of the pilot on board that may indicate that the condition of a pilot on board is incompatible with the proper conduct of a flight.

In addition, a method for piloting an aircraft such as the one described above is proposed, in which the detection means analyse an aircraft trajectory to detect a risk of malicious act by the pilot on board. In addition, a method for piloting an aircraft such as the one described above is proposed, including the steps, implemented by the alternative piloting system, of defining a piloting set-point selected from a manual piloting setpoint produced by the pilot on board, an automatic piloting setpoint produced by the automatic flight control system, the ground piloting setpoint produced by the ground pilot, and an alternative piloting setpoint produced by the alternative piloting system, and transmitting the selected control setpoint to the flight control system of the aircraft.

The invention will be better understood when reading the following description of a particular non-restrictive embodiment of the invention.

BRIEF DESCRIPTION OF THE DRAWINGS

Reference is made to the appended drawings, wherein.

DETAILED DESCRIPTION OF THE INVENTION

Figure 1:
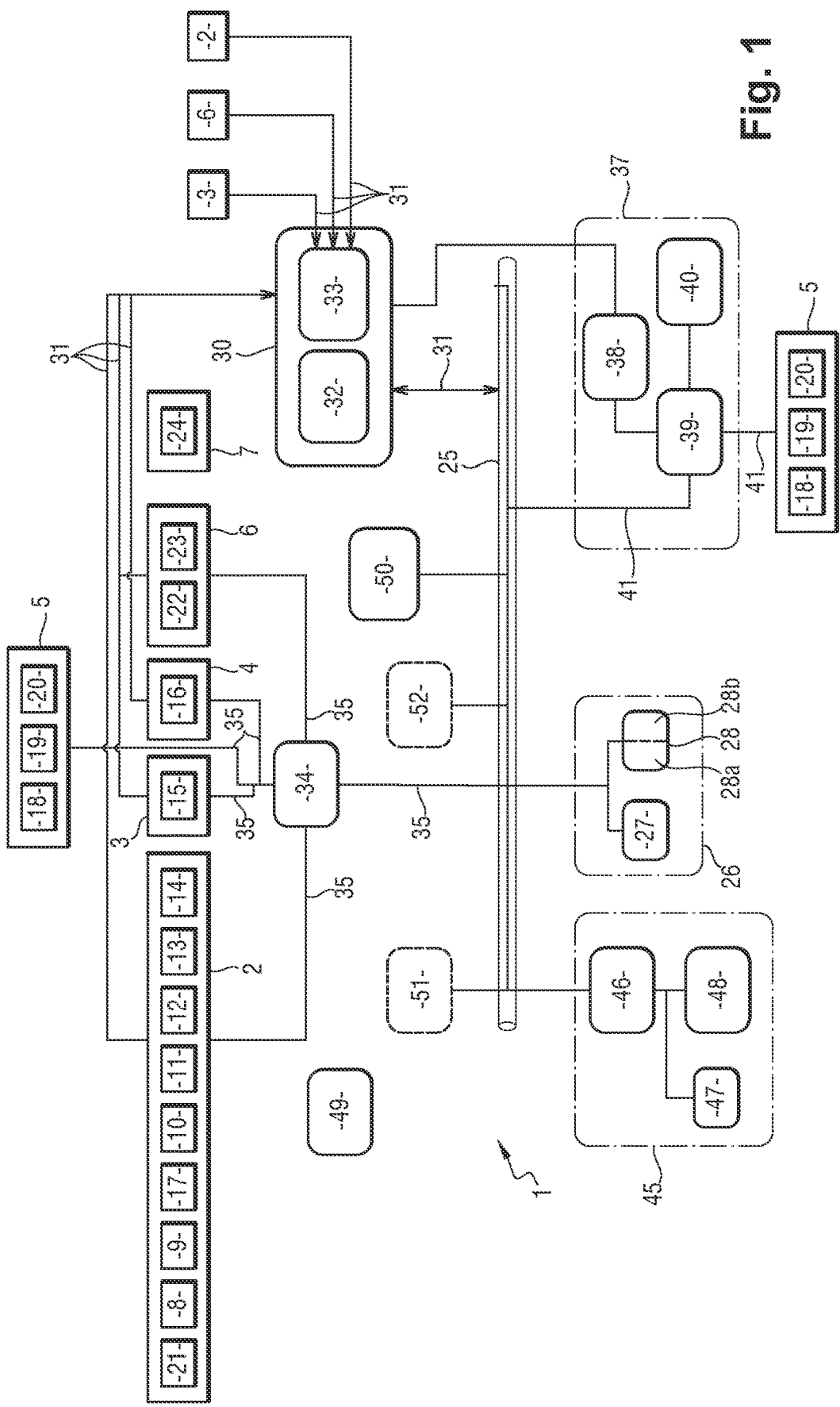
FIG. 1 represents an alternative piloting system, as well as a plurality of original systems of a pre-existing aircraft.

With reference to FIG. 1, an alternative piloting system 1 is integrated into a pre-existing aircraft. "Pre-existing aircraft" means that, when the aircraft was designed, it was not intended to be equipped with the alternative piloting system 1. In other words, the aircraft, at the time of its design, does not have any specific interfaces for the integration of the alternative piloting system.

The aircraft is a commercial aircraft that is intended to be converted into a cargo aircraft that can be piloted by a single pilot on board. The alternative piloting system allows, in the absence of a human co-pilot, to provide accompaniment to the pilot on board. This support is provided by the alternative piloting system itself, but also by ground staff and in particular by a ground supervisor and a ground pilot.

The alternative piloting system 1 is integrated into the aircraft so that it can be piloted by this single pilot on board while complying with the safety and security requirements applicable to a conventional cargo aircraft piloted by several pilots.

The aircraft includes a number of original systems, i.e. systems present at the time of aircraft design.

These original systems include a flight control system 2, a landing gear system 3, a lighting system 4, a communication system 5, an automatic control system 6, a navigation system 7.

The original systems obviously include other systems that are not mentioned here.

All original systems include equipment that may be redundant or even tripled.

The flight control system 2 includes pilot controls, positioned in the cockpit and operable by the pilot on board, with a throttle lever 21, rudder pedals 8, trim control wheel 9, SSU (for Side-Stick Unit) type 17 sleeves or active mini sleeves.

The flight control system 2 also includes flight control computers including ELAC 10 (for Elevator Aileron Computer), SEC 11 (for Spoiler Elevator Computer), FAC 12 (for Flight Augmentation Computer), SFCC 13 (for Slat Flap Control Computer) and THS 14 (for Trimmable Horizontal Stabilizer).

The landing gear system 3 includes a system for controlling the orientation of at least one landing gear system, which controls the direction of the aircraft as it moves on the ground, and a braking system.

The landing gear system 3 includes a BSCU (Braking and Steering Control Unit) control unit 15.

The lighting system 4 includes headlights 16 and headlight control means.

The communication system 5 includes means of communication in the VHF band 18 (Very High Frequency), means of communication in the HF band 19 (High Frequency), as well as means of communication by satellite 20 (SATCM).

The automatic control system 6 consists of one or more FMGC 22 (for Flight Management Guidance Computer) and one or more FADEC 23 (for Full Authority Digital Engine Control) ECU(s).

The navigation system 7 includes one or more ADIRS 24 system(s) (for Air Data Inertial Reference System).

The alternative piloting system 1 interfaces with these original systems and with the original avionics, but is completely separate, distinct from these original systems and the original avionics.

"Separate" means that the original systems and original avionics, on the one hand, and the alternative control system 1, on the other hand, do not include any common equipment.

The separation is mechanical, software and hardware. Thus, a trouble or failure (caused for example by hacking) of the alternative piloting system 1 does not have a significant impact on the original systems and on the original avionics.

The alternative piloting system 1 consists of a plurality of devices and a main bus 25, which is here a data bus ARINC 664, on which commands and data can flow.

The different devices of the alternative piloting system 1 communicate with each other via the main bus 25. All the devices of the alternative piloting system 1 are equipped with appropriate means of protection (firewall, virus control, etc.) to secure these communications.

The devices of the alternative piloting system 1 first of all include a flight control device 26. The flight control device 26 is only connected to the main bus 25.

The flight control system 26 is thus totally independent of the aircraft original systems and is therefore almost completely autonomous.

The flight control device 26 consists of a positioning unit 27 and a control unit 28 (or FSS, for Flight Stability System).

The positioning unit 27 includes an inertial measurement unit, a satellite positioning device (or GNSS, for Global Navigation Satellite System) comprising one or more antenna(s), and an anemobarometric control unit.

The positioning unit 27 produces aircraft positioning data. Positioning data includes aircraft location and orientation data.

The positioning unit 27 is independent and autonomous from the aircraft original positioning equipment, and is different in design. This introduces dissimilarities between the positioning unit 27 and the aircraft original positioning equipment, which in particular prevents a common mode failure from leading to a simultaneous failure of the aircraft original positioning equipment and the positioning unit 27.

The control unit 28 is a flight control computer developed according to a Development Assurance Level (DAL).

The control unit 28 includes two dissimilar calculation channels 28a, 28b. This prevents a common mode failure from causing a simultaneous failure of both calculation channels 28a, 28b and therefore of the control unit 28.

Each calculation channel 28a, 28b has a COM/MON architecture and includes a control module and a monitoring module.

The control unit 28 ensures safe control during taxiing, take-off, cruise and landing phases when the aircraft is piloted by a single pilot on board.

The control unit 28 is thus arranged to produce an alternative piloting setpoint for the aircraft.

This alternative piloting setpoint is used to fly the aircraft when the aircraft is in a particular emergency situation that is part of a predefined list of emergency situations.

The pre-defined list of emergency situations includes any failure occurring on the aircraft, such as a failure of an aircraft engine, a failure of the aircraft automatic flight control system 6, a failure of the pilot on board, a malicious act of the pilot on board, a situation in which the aircraft is heading towards a pre-defined prohibited area, a loss of communication with the ground station when the aircraft is piloted by the ground pilot present at a ground station.

In particular, the control unit 28 hosts emergency flight laws, which are implemented in the event of a failure of the aircraft automatic flight control system. Emergency flight laws stabilize the aircraft and keep it flying.

The control unit 28 also hosts control laws in degraded mode.

Among the laws of degraded mode control is a law that addresses a pilot failure on board during the aircraft take-off. The failure of the pilot on board results, for example, from a sudden death of the pilot or from a physical or psychological incapacity of any kind occurring during the flight.

During the take-off of the aircraft, if the pilot on board has a failure, it is still possible to abort the take-off as long as the aircraft speed is below a specified speed V1. When the aircraft speed exceeds the determined speed V1, the take-off can no longer be rejected because the aircraft ground braking at high speed is too risky, and it is then compulsory to have the aircraft take off.

Between the time the aircraft exceeds the determined speed V1 and the time the aircraft exceeds a determined altitude, for example 200 feet, the pilot normally pilotes the aircraft in manual mode: the automatic flight control system 6 is not used during this particular phase.

Thus, when a pilot's failure on board is detected during this period, which lasts a few seconds, typically six seconds, it is the alternative piloting system 1 that takes over from the pilot on board and manages the take-off.

Then, the automatic flight control system 6 takes over from the alternative piloting system 1.

In the event of pilot's failure, the control unit 28 also houses emergency flight plans. Thus, if the pilot has a failure, the alternative piloting system 1 can direct the aircraft to an airport where it can land.

It is specified that, in the event of a pilot's failure, the alternative piloting system 1 is capable of controlling the aircraft, but it is not necessarily the pilot who flies the aircraft. For example, if the automatic control system 6 is operational, it brings the aircraft to the emergency airport on the ground according to the pilot's instructions, and automatically lands the aircraft.

The control unit 28 can also produce the alternative piloting setpoint in such a way as to prevent the aircraft from entering predefined prohibited areas. The geographical coordinates of the predefined prohibited areas are stored in the control unit 28.

The alternative piloting setpoint allows the aircraft to follow a trajectory that no longer leads to an entry of the aircraft into predefined prohibited areas. A predefined prohibited area is for example an area with special infrastructure (e. g. a nuclear power plant), an area with a high population density, etc.

The control unit 28 continuously calculates the future trajectory of the aircraft using the positioning data generated by the positioning unit 27, and estimates whether the future trajectory interferes with a predefined prohibited area. In the event that the pilot is heading towards a predefined prohibited area for the purpose of voluntarily crashing the aircraft, the alternative piloting setpoint produced by the alternative piloting system 1 is used to fly the aircraft and to prevent it from entering the predefined prohibited area. If necessary, the alternative piloting setpoint will cause the aircraft to crash in a depopulated area. This implements a geofencing function: the aircraft position is monitored in real time and, if it is heading towards a predefined prohibited area, its trajectory is actively controlled to prevent the aircraft from entering the predefined prohibited area.

The control unit 28 thus implements controlled crash guidance laws and a loss detection algorithm for the geographical prohibition function.

The alternative piloting system 1 also includes an acquisition and analysis device 30. The acquisition and analysis device 30 is connected to the main bus 25, but also to the flight control system 2, the landing gear system 3, the lighting system 4, the communication system 5, and the automatic control system 6, via secondary buses 31 which are here buses A429. The buses A429 are original, pre-existing buses in avionics.

The acquisition and analysis device according to the invention 30 consists of acquisition means 32 and analysis means 33.

The acquisition means 32 include a plurality of interfaces with the original systems and a plurality of interfaces with the main bus 25.

The acquisition means acquire parameters including data generated by the aircraft original systems as well as positioning data and alternative piloting setpoint generated by the flight control device 26. The parameters also include the ground piloting setpoint.

Data generated by the aircraft original systems and acquired by the acquisition means include aircraft position data, attitude data, parameters produced by the automatic control 6, parameters produced by the flight control system 2, engine parameters, navigation data, failure data, etc.

The analysis means 33 of the acquisition and analysis system 30 carry out processing and analyses on all these parameters.

The analysis means 33 detect possible inconsistencies between these parameters.

The analysis means 33 processes the parameters to transform them into aircraft parameters (sorting, formatting, etc.) that can be transmitted to the rest of the alternative flight system 1, on the ground, etc.

The analysis means 33 also host state machines that support the pilot (cross checks, additional pilot actions), but also to initiate emergency procedures, or to authorize the taking into account of commands from the control system 26.

The analysis means 33 evaluate from these parameters the condition of the aircraft and the current flight phase.

The condition of the aircraft may be a normal or abnormal condition.

The analysis means 33 implements a state machine to select, from the parameters, the state of the aircraft and the current flight phase, a piloting setpoint selected from a plurality of piloting setpoints including the manual piloting setpoint produced by the pilot on board via the pilot controls, a ground piloting setpoint produced by the first officer on the ground, an automatic piloting setpoint produced by the automatic flight control system, and the alternative piloting setpoint.

The analysis means 33 manage the flight plan modification instruction, which is defined either by the pilot on board or by the ground pilot. The analysis means 33 manage the switching of the trajectory management to be followed, which is defined either by the pilot on board, or by the ground pilot, or by the original automatic flight control system, or by the alternative piloting system 1.

A first example of analysis has already been mentioned earlier in this description. At the time of take-off, there is a short period of time during which the aircraft is normally piloted manually by the pilot. If a pilot failure is detected, the analysis means 33 of the acquisition and analysis device 30 shall decide that the alternative piloting setpoint produced by the alternative piloting system 1 shall be used to operate the aircraft. Then, following this short period, the analysis means 33 of the acquisition and analysis device 30 decide that the alternative piloting setpoint must no longer be used to fly the aircraft. The automatic flight control system 6 thus takes over from the alternative piloting system 1 to land the aircraft safely.

A second example of priority setpoint selection is as follows.

If a manual piloting setpoint, produced by the pilot on board, tends to direct the aircraft to a predefined prohibited area, the analysis means 33 of the acquisition and analysis device 30 shall decide that the alternative piloting setpoint produced by the alternative piloting system 1 shall be used to fly the aircraft. The aircraft then performs a manoeuvre to avoid entering the prohibited area.

It can also be expected that, in this case, the use of the alternative piloting setpoint will be decided from the ground. The analysis means 33 of the acquisition and analysis device 30 acquire this decision and direct the alternative piloting setpoint to the flight control computers.

Then, following this manoeuvre, the analysis means 33 decide that the alternative piloting setpoint must no longer be used to fly the aircraft: the acquisition and analysis device 30 gives back the hand to the automatic flight control system 6 after the alternative piloting system 1 has performed the manoeuvre.

A third example of priority setpoint selection is as follows.

Thanks to the analysis of aircraft parameters (and for example the analysis of engine and control instructions), the acquisition and analysis device 30 is also able to detect a failure affecting the aircraft. If the aircraft is controlled by the automatic flight control system 6 and this failure is likely to impact the automatic flight control system 6, the acquisition and analysis device 30 shall decide that the alternative piloting setpoint shall be used to fly the aircraft and shall initiate an emergency flight mode. The emergency flight mode is a temporary flight mode, which is active until the pilot on board or ground pilot regains control of the aircraft.

The emergency mode is also engaged in the event of inoperability of the automatic flight control system 6. Indeed, there are situations in which the automatic flight control system 6 is not broken down but disengages because it is no longer able to fly the aircraft safely. This is the case, for example, when probes have frozen.

The alternative piloting system 1 also includes an interface device 34.

The interface device 34 is connected to the main bus 25, but also to the flight control system 2, the landing gear system 3, the lighting system 4, the communication system 5 and the automatic flight control system 6, via secondary buses 35 which are here buses A429.

The interface device 34 includes switch means including a very high integrity relay system.

The relays are controlled by the analysis means 33 of the acquisition and analysis device 30. When the analysis means 33 decides that the alternate piloting setpoint shall be used to fly the aircraft, the analysis means 33 produces a switch instruction to control the relays so that they connect an output of the flight control device 26 to the flight control system 2. Similarly, when the analysis means 33 decides that the ground piloting setpoint shall be used to fly the aircraft, the analysis means 33 shall control the relays to transmit the ground piloting setpoint to the flight control system 2.

The interface device 34 performs the physical interface by activating the aircraft controls and emulates the aircraft controls: flight controls, trains, flaps, breakers, etc.

The interface device 34 allows commands to be sent to the original ECUs as if they were sent by a pilot on board via the cockpit interfaces.

The alternative piloting system 1 also includes a communication device 37 which includes an SDM module 38 (for Secured Data Module), an ADT module 39 (for Air Data Terminal) and a C2 link module 40.

These modules form interface means with a remote flight control system, communication means with remote control, as well as data security means to ensure the integrity of the recorded information. Integrity is based in particular on the security of recorded data and orders according to the principles implemented in a Safety Checker.

The communication device 37 is connected to the main bus 25 via the ADT module 39, but also to the communication system 5 via secondary buses 41 which are here buses A429.

The communication device 37 is connected to the acquisition and analysis device 30 by a serial link.

The communication device 37 allows remotely controlled operation on the aircraft. In particular, the communication device 37 makes it possible to establish communication with the ground, so that the alternative piloting system 1 can be controlled from the ground, or other systems (e. g. the automatic control system 6) can be controlled from the ground via the alternative piloting system 1. Thus, in the event of pilot's failure, for example, radio communications and control of aircraft trajectories can be managed from the ground.

The C2link module 40 is now described in greater details.

The aircraft is connected to a ground station by a command and control system (system C2). The system C2 allows a ground pilot to fly the aircraft from the ground station, in which the ground pilot is positioned.

The system C2 implements data links through which data is exchanged between the aircraft and the ground station. The C2link module 40 manages data link communications for the aircraft.

This data includes ground piloting setpoints sent to the aircraft, as well as information (measurements, parameter estimates, etc.) sent by the aircraft to the ground station and used to produce ground piloting setpoints.

Data can be exchanged via a direct radio link (LOS link, for Line-of-Sight) or via an indirect radio link (BLOS link, for Beyond Line-of-Sight).

When the LOS link is implemented, data is exchanged directly between the aircraft and the ground station. The LOS link complies, for example, with FAA DO-362 or Eurocae WG105 standards.

The term BLOS refers to any link that is not a LOS link. Thus, when a BLOS link is implemented, data is exchanged between the aircraft and the ground station via one or more relay(s), including for example a satellite or a terrestrial communication network. Two separate BLOS links are used here, each using a separate SATCOM system: INMARSAT and IRIDIUM NEXT.

Figure 2:
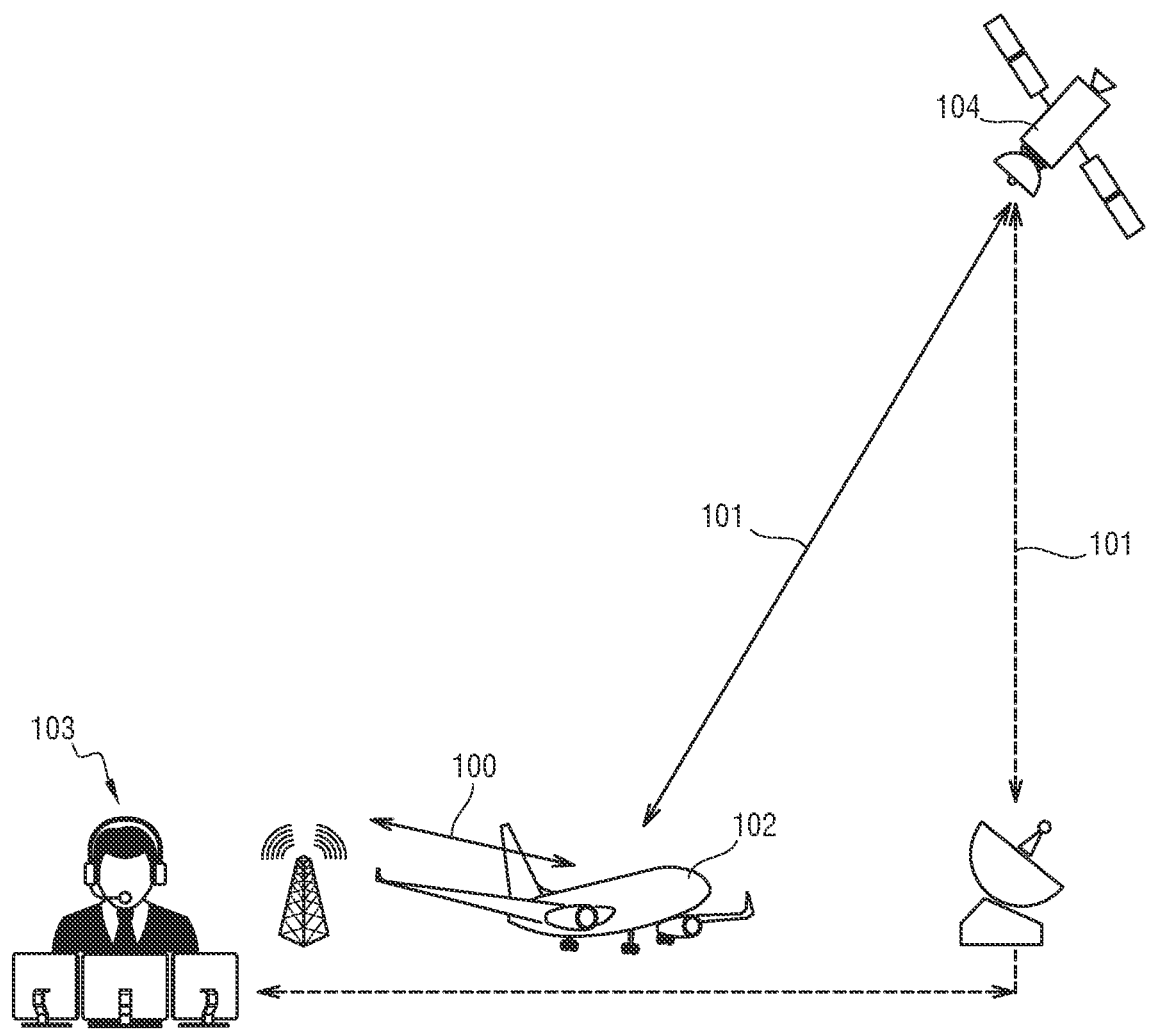
FIG. 2 represents, during the aircraft climb phase, a primary data link and a secondary data link of a system C2 that connects the aircraft and the ground, the primary data link being an LOS link and the secondary data link being a first BLOS link.

With reference to FIG. 2, during the (flight) phases of parking, taxiing to the take-off runway, take-off, and at the beginning of the climb phase, the LOS link 100 is a primary data link, used in nominal operation to transmit data, and the first BLOS link 101 is a secondary data link, used to redundant the LOS link 100 and to replace it in case of loss of the LOS link 100. The aircraft 102 and the ground station 103 communicate directly through the LOS link 100, and indirectly, through a first SATCOM system 104, through the first BLOS link 101.

During the climb phase, before the aircraft 102 reaches the range limit of the LOS link 100, a switch is made: the first BLOS link 101 becomes the primary data link and the LOS link 100 becomes the secondary data link. Alternatively, the second BLOS link can be used as a secondary link.

Figure 3:
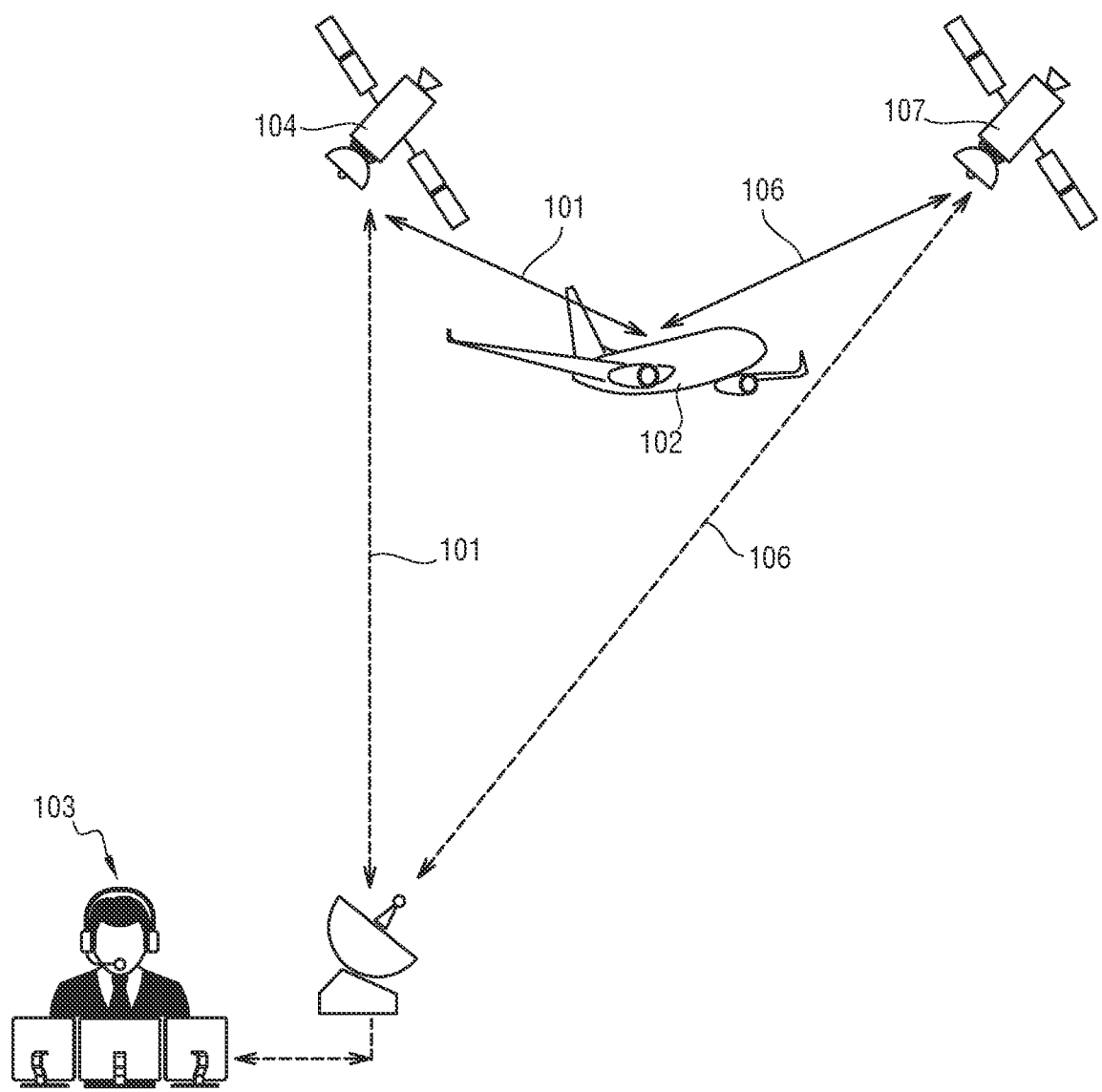
FIG. 3 represents, during the aircraft cruise phase, the primary and secondary data links of the system C2, the primary data link being the first BLOS link and the secondary data link being a second BLOS link.

Then, with reference to FIG. 3, at the end of the climb phase and during the cruise phase, the first BLOS link 101 is used as the primary data link and the second BLOS link 106 is used as the secondary data link (or vice versa).

The second BLOS link 106 uses a second SATCOM system 107.

Figure 4:
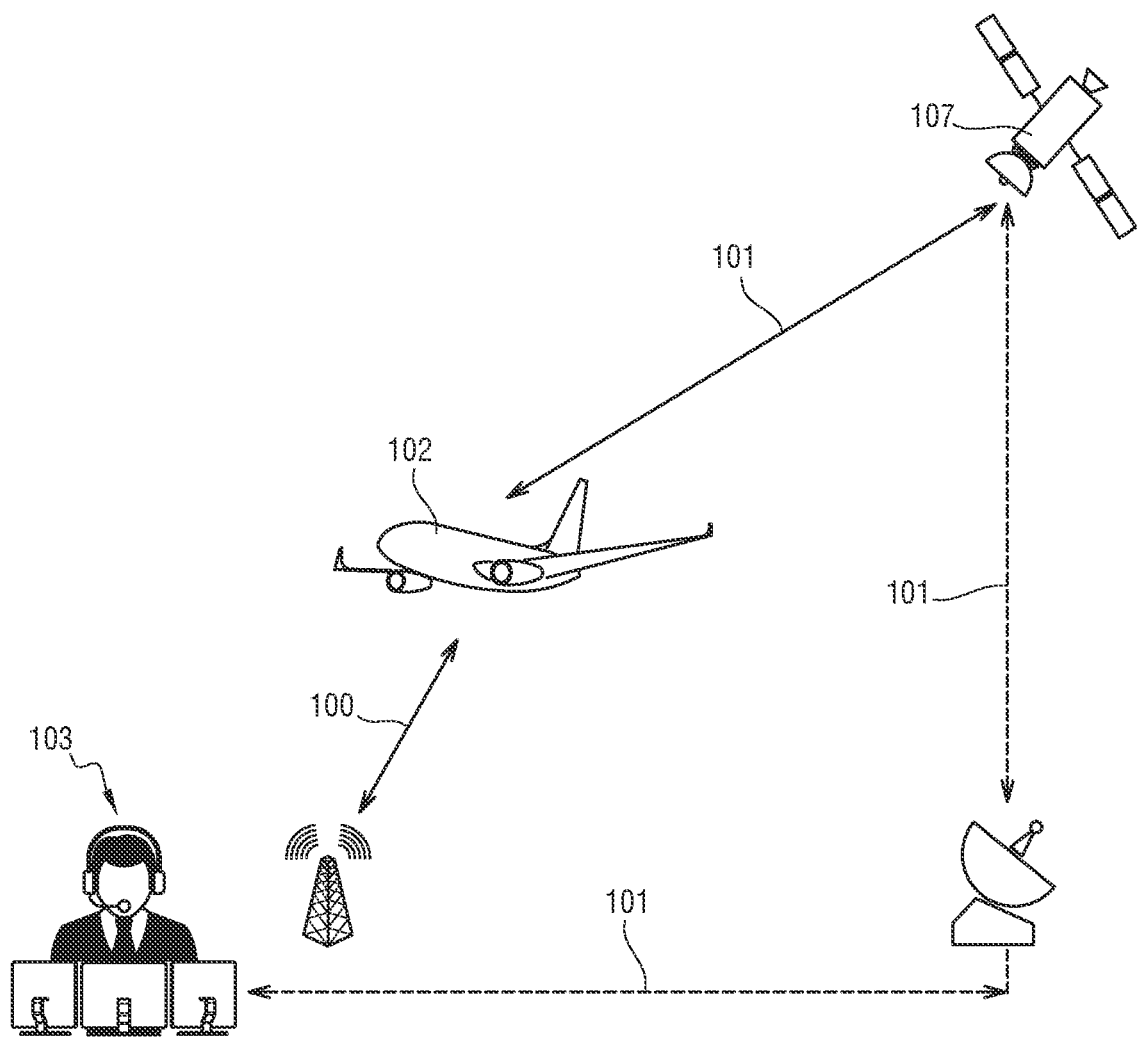
FIG. 4 represents, during the descent phase of the aircraft, the primary and secondary data links of the system C2, the primary data link being the LOS link and the secondary data link being the first BLOS link.

Then, with reference to FIG. 4, during descent, when the aircraft 102 returns to the range limit of the LOS link 100, a switch occurs: the LOS link 100 becomes the primary data link and the first BLOS link 101 (or the second BLOS link) becomes the secondary data link. This configuration is maintained during landing, taxiing to the parking lot and parking.

The alternative piloting system 1 also includes a taxiing control device 45 which includes a TAS module 46 (for Taxi Assistance System), a guidance device 47 which can use one or more camera(s) and perform image processing, and an anti-collision device 48 using for example a radar but also, potentially, a camera imaging device (day, LWIR).

The taxiing control device 45 is connected only to the main bus 25.

The taxiing control device 45 is capable of producing a ground-based aircraft piloting setpoint. The taxiing control device 45 is capable of controlling the braking of the aircraft in the event of incapacity of the pilot on board before the aircraft reaches the determined take-off speed V1 (see earlier in this description), and also allows the runway centreline to be maintained in these conditions.

The taxiing control device could also perform taxiing instead of the pilot.

The alternative piloting system 1 also includes a power supply device 49 with uninterrupted power supply. The power supply device 49 is an autonomous and independent device, which supplies power to the alternative piloting system 1 even in the event of a failure affecting the aircraft power generation systems. The power supply device 49 is connected to the other devices of the alternative piloting system 1 by independent power buses.

The alternative piloting system 1 also includes an aircraft monitoring system for the aircraft 50.

The aircraft monitoring system 50 includes a display positioned in the cockpit.

The aircraft monitoring system 50 is connected to the main bus 25.

The alternative piloting system 1 also includes a pilot monitoring system 51. The pilot monitoring system 51 is used to detect that the aircraft is in the emergency situation corresponding to a failure of the pilot on board.

The pilot monitoring system includes a camera that acquires images of the face, and in particular the eyes of the pilot on board.

The pilot monitoring system 51 also includes a detection system capable of detecting, in less than 2 seconds, a pilot's incapacity, thanks to biometric sensors and specific sensors. The detection system requires the pilot to take continuous and deliberate action during certain phases, such as during take-off, manual landing, and possibly during taxiing the aircraft (a runway incursion being potentially catastrophic). The specific sensors used for this purpose by the detection system may be push-pieces on the control column and throttle that are to be crushed during take-off, or optical sensors to verify that the pilot on board has his/her hands on the controls. The pilot monitoring device 51 is connected to the main bus 25.

The alternative piloting system 1 also includes a virtual co-pilot 52. The purpose of the virtual co-pilot 52 is to anticipate risk situations and warn the pilot on board in the event that such situations are likely to occur. The purpose of the virtual co-pilot 52 is also (and above all) to cross-check critical data and actions, and also to automatically perform tasks, so as to maintain an acceptable load the aircraft for the pilot on board both when the aircraft is in a normal state and when an emergency situation occurs. It also has a voice interface with the pilot on board, and a visual interface. It also generates audio messages. It is composed of a state machine part, a processing module, and a Human Machine Interface (HMI) part. The virtual co-pilot 52 is connected to the main bus 25. The virtual co-pilot 52 has a voice assistance system. The voice assistance system allows the pilot on board to interact vocally and exchange information with the various aircraft systems. In particular, the voice assistance system is connected to the acquisition and analysis device 30, which acts as an interface with these different systems.

Voice interaction is in both directions. The orders of the pilot on board are taken into account by the voice assistance system. The voice assistance system transmits information to the pilot on board: reading checklists and proposing actions according to predefined procedures.

The voice assistance system also makes it possible to check the actions carried out by the pilot on board and to alert the pilot on board in the event of an error.

The voice assistance system therefore assists the pilot on board in the same way as a human co-pilot. The pilot on board can thus fly the aircraft while being assisted or even supplemented to activate systems, to follow predefined procedures, etc.

The voice assistance system can also, at the request of the pilot on board, manage the frequencies used when the pilot on board communicates with air traffic control.

The voice assistance system can be permanently active or activated by an activation function. The activation function is then in permanent active standby.

The activation function activates the voice assistance system after receiving a keyword from the pilot on board, or after another activation action performed by the pilot on board, such as pressing a push button.

The activation function can also activate the voice assistance system spontaneously, without the pilot on board, for example in the event of an ECAM (Electronic Centralized Aircraft Monitoring) message, in the event of detection of an error made by the pilot on board, or in the event of procedure automation (confirmation of the status of an automated function).

The voice assistance system includes a pilot microphone coupled to a voice recognition device.

The pilot microphone acquires the orders issued by the pilot on board and produces an analog audio signal.

The voice recognition device then converts the analog audio signal into a digital text. The voice recognition device identifies the keyword mentioned earlier in the digital text. The digital text itself is converted into a system command, in a suitable format and standard, for use in aircraft systems.

The voice assistance system consists of one or more loud-speaker(s) and one or more headphone(s) positioned in the cockpit. The voice assistance system can thus produce audio messages for the pilot on board.

The voice assistance system interacts with a processing module, which is integrated into the acquisition and analysis device 30.

The processing module implements a router function that transfers the system command to the system and equipment concerned. The router function also allows to retrieve useful information for knowing the state and environment of aircraft systems.

The processing module analyses the environment of the embedded systems and allows to take into account the reading of the ECAM procedures.

The processing module acquires and analyses feedback on the status of aircraft systems and automated functions.

The processing module can also perform actions to react to the detection of an error produced by the pilot on board or a non-compliant action.

The processing module performs cross-checks of the actions of the pilot on board with predefined procedures, including checks of the lists.

For example, if the pilot on board reports the following check to air traffic control: "Roger, I climb FL 360" and when the pilot on board returns and validates the order "FL 370", the voice assistance system announces "Attention FL entered not in accordance with the FL 360 checked".

The voice assistance system may also include a surround microphone associated with a device to take into account the audio environment. The audio environment management system prevents second-level information from being communicated to air traffic control during air traffic control messages, and reduces the background noise of pilot voice commands.

The voice assistance system also implements a stress evaluation function.

The stress evaluation function makes it possible to evaluate the stress level of the pilot on board and, if this stress level is too high, to detect the incapacity of a pilot on board. Here, "stress" refers to any type of psychological disorder that may reduce the ability of the pilot on board.

The stress evaluation function uses the voice recognition device mentioned above. The stress evaluation function also uses a voice analysis device, a personal voice database, a question and answer database, a psychological state analysis device and an audio configuration database.

The voice assistance system can also be coupled with a video sensor of the system 51 to improve the stress evaluation.

The personal voice database includes recordings of the voice of the pilot on board, which were made by the same pilot on board before the flight, for example when the pilot on board was hired by the airline operating the air-craft.

The voice assistance system evaluates the stress level of the pilot on board as follows.

The stress evaluation function is activated before each take-off, in order to estimate the condition of the pilot on board and to adjust the voice recognition in relation to the voice of the pilot on board, typically in the case where the pilot on board has a cold or a sore throat.

The voice assistance system asks the pilot a first set of questions contained in the question and answer database.

The voice recognition device acquires the first responses from the pilot and converts them into a format that can be read by the voice analysis device.

The voice analysis device compares the intonation of the pilot's voice with the voices contained in the personal voice database, and the content of the first responses with the responses contained in the question and answer data-base.

The psychological state analysis system produces a first level of stress based on these initial responses. The first level of stress is used to define the potential need for further questions, as well as the type of questions, in order to refine the evaluation of the stress of the pilot on-board. The first stress level also determines the best possible configuration for the voice assistance system to optimize interactions with the pilot on board and reduce the stress level of the pilot on board to an acceptable level, if possible.

This involves an iterative process of determining the stress level.

If it is not possible to reduce the stress level to an acceptable level, the voice assistance system generates an alert that is communicated in real time to the actors on the ground (ground supervisor, ground pilot).

The results of the stress evaluation function can also be analyzed at the end of the flight.

The audio configuration database makes it possible to adapt the behaviour of the voice assistance system. The audio configuration database makes it possible to change the voice used by the voice assistance system: male voice, female voice, deep voice, high-pitched voice, firm or reassuring pronunciation. The audio configuration base makes it possible to change the frequency of message delivery, which is more or less supported. The audio configuration database also makes it possible to produce messages with a particular intonation, humour, benevolent messages, reassuring messages, strong personal messages, etc.

The use of the voice assistance system is very advantageous. The voice assistance system allows the evaluation of the stress of the pilot on-board without the use of sensors such as biometric sensors, temperature sensors, cardiograms, encephalograms, etc.

The use of these sensors can be problematic, as they are likely to generate anxiety for the pilot on board who may feel watched.

Such sensors must also be connected to a central system that analyzes the data generated by the sensors. The connection is made by means of wires, which may interfere with the movements of the pilot on board, or by radio waves, which may produce electromagnetic disturbances that may degrade the operation of aircraft systems.

The aircraft also includes detection means to detect a malicious pilot on board who may perform a malicious act. The malicious nature of the pilot on board can be detected by analyzing the aircraft trajectory.

The present or future position of the aircraft can be compared with the coordinates included in the database listing the predefined prohibited areas. When the aircraft enters or is about to enter a prohibited area, a malicious act of the pilot on board (or at least an indication of a malicious act, to be confirmed) is detected. The flight control device 26 can both predict the trajectory and detect the malicious nature of the pilot on board using the geofencing function.

The malicious nature of the pilot on board can also be detected following the detection of an abnormal flight attitude of the aircraft. The flight control device 26 can, once again, carry out this detection.

The malicious nature of the pilot on board can also be detected from the ground station, through a voice exchange with the pilot on board. The voice assistance system described earlier can be used.

The voice exchange can be used not to detect but only to confirm, from the ground, the malicious nature of the pilot on board, following a detection of the malicious nature using the aircraft trajectory.

When the malicious nature of the pilot on board is confirmed (a priori by the ground, i. e. by the ground supervisor or by the ground pilot), control actions are implemented.

All cockpit controls that may affect aircraft handling, directly or indirectly (e. g. via the Flight Control Unit or via the Flight Plan), are inhibited.

The pumps in the hydraulic circuits can be deactivated: the mechanical emergency controls can be used to activate the hydraulic actuators on certain piloting surfaces (including the elevator). In parallel, electrical commands are sent to the actuators to lower the pressure as quickly as possible.

The alternative piloting system 1 or the ground pilot then takes control of the aircraft to put it on a trajectory avoiding the predefined prohibited areas and to fly the aircraft to an appropriate area, so as to put an end to the "malicious pilot" event.

The transponder code is changed so that air traffic control is informed that the pilot on board is malicious.

The new trajectory of the aircraft is then either provided by the ground via the system data links C2 or by the pilot system 26 based on a map database of population densities and sensitive areas.

The alternative piloting system 1 is capable of piloting the aircraft only with the engines.

In order to allow these actions to be carried out, it is expected that the take-off of the aircraft with a single pilot on board is only possible if the systems involved in detecting and preventing the malicious nature of the pilot on board are all functional.

A number of installation constraints are necessary to detect the malicious nature of the pilot on board and to implement the aircraft control actions.

The systems required to detect and carry out these actions are powered by a backup power network (including, for example, a backup battery), installed beyond the reach of the pilot on board.

When the pilot is not malicious, these systems are powered by a conventional power network.

The power supply automatically switches to the emergency power network in the event of a loss of the conventional power network (if these systems are not already supplied by the emergency power network).

The equipment comprising these systems, as well as the power circuit breakers, are installed beyond the reach of the pilot on board.

The power supply circuits of the existing systems required for the detection measurements are modified so that the circuit-breakers are out of reach of the pilot on board. When the malicious nature of the pilot on board is confirmed, control actions of the pilot on board are carried out.

The pilot on board can be controlled by using a gas that forms a fog to block his/her field of vision. The pilot on board can be controlled by the use of incapacitating gas (however, this measure can easily be bypassed upstream if the pilot on board has his/her oxygen mask on). The pilot on board can be controlled by triggering an audible signal. An aircraft control method will now be disclosed in greater details while referring to FIGS. 5 to 7.

New actors are involved in the piloting of the aircraft. These new actors include a ground supervisor and a ground pilot.

The aircraft is likely to be piloted by a single ground pilot, who is positioned in a ground station.

The ground supervisor, on the other hand, supervises the flights of a plurality of aircrafts. The ground supervisor may be in the same ground station as the ground pilot, but not necessarily.

Figure 5:
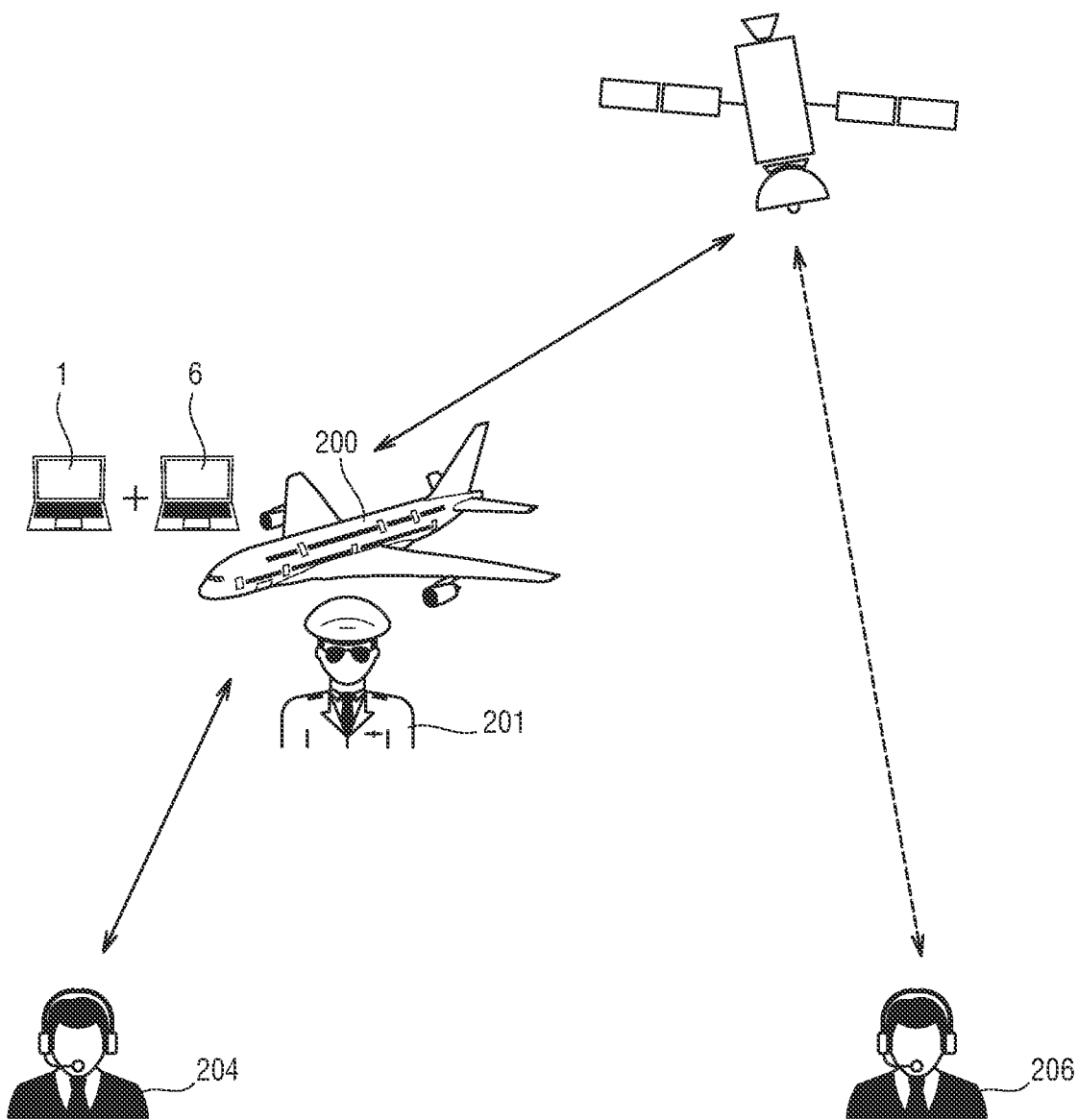
FIG. 5 represents air traffic control and the actors involved in piloting an aircraft in a normal situation.

With reference to FIG. 5, when the aircraft 200 is in a normal state, the flight situation is a normal one: the aircraft 200 is piloted by a nominal crew consisting of the single pilot on board 201, the alternative piloting system 1 and the automatic flight control system 6. The pilot on board 201 also communicates with air traffic control 204.

The alternative piloting system 1 interacts with both the pilot on board 201 and the aircraft systems. The alternative piloting system 1, thanks in particular to the virtual co-pilot 202, replaces the human co-pilot.

Direct exchanges between the pilot on board 201 and the alternative piloting system 1 are preferred to increase reactivity in taking into account the information exchanged.

The exchanges between the pilot on board 201 and the alternative piloting system 1 are limited and normalized according to the current flight phase and the condition of the aircraft. In particular, the alternative piloting system 1 shall only execute an order of a pilot on board 201 if that order is part of an eligible list that depends on the current flight phase and the condition of the aircraft. It is also noted that the actions of the pilot on board 201 on the systems of the aircraft 200 are automated as much as possible. The pilot on board 201 validates all critical actions by checking the activation status of non-critical actions.

When the pilot on board 201 issues an order to the alternative piloting system 1 via the virtual co-pilot 52, the order is reformulated by the virtual co-pilot 52 to ensure that the correct order is taken into account.

When the aircraft 200 is in the normal state, the ground pilot is not operational. A non-operational ground pilot is relieved of any flight control action, but may possibly carry out an action to monitor certain parameters of the aircraft or flight.

The ground supervisor 206 can also intervene to carry out a monitoring action.

During a flight, a special emergency situation may occur that could affect the operation of the aircraft 200.

The particular emergency situation belongs to the predefined list of emergencies that was seen earlier, which includes the incapacity of the pilot on board, malicious act by the pilot on board and engine failure.

The occurrence of this particular emergency situation is detected by the detection means. The detection means include the voice assistance system of the alternative piloting system 1, which makes it possible to detect a level of stress of the pilot on board and therefore an incapacity of the pilot on board. The detection means also include the flight control device 26 of the alternative piloting system 1, which is capable of detecting the pilot's malicious nature by analyzing the aircraft trajectory and position.

The detection means also include the aircraft monitoring system 50 and the pilot monitoring system 51 of the alternative piloting system 1.

The means of detection also includes the aircraft original monitoring systems, which detect any failure of the air-craft, including an engine failure.

Figure 6:
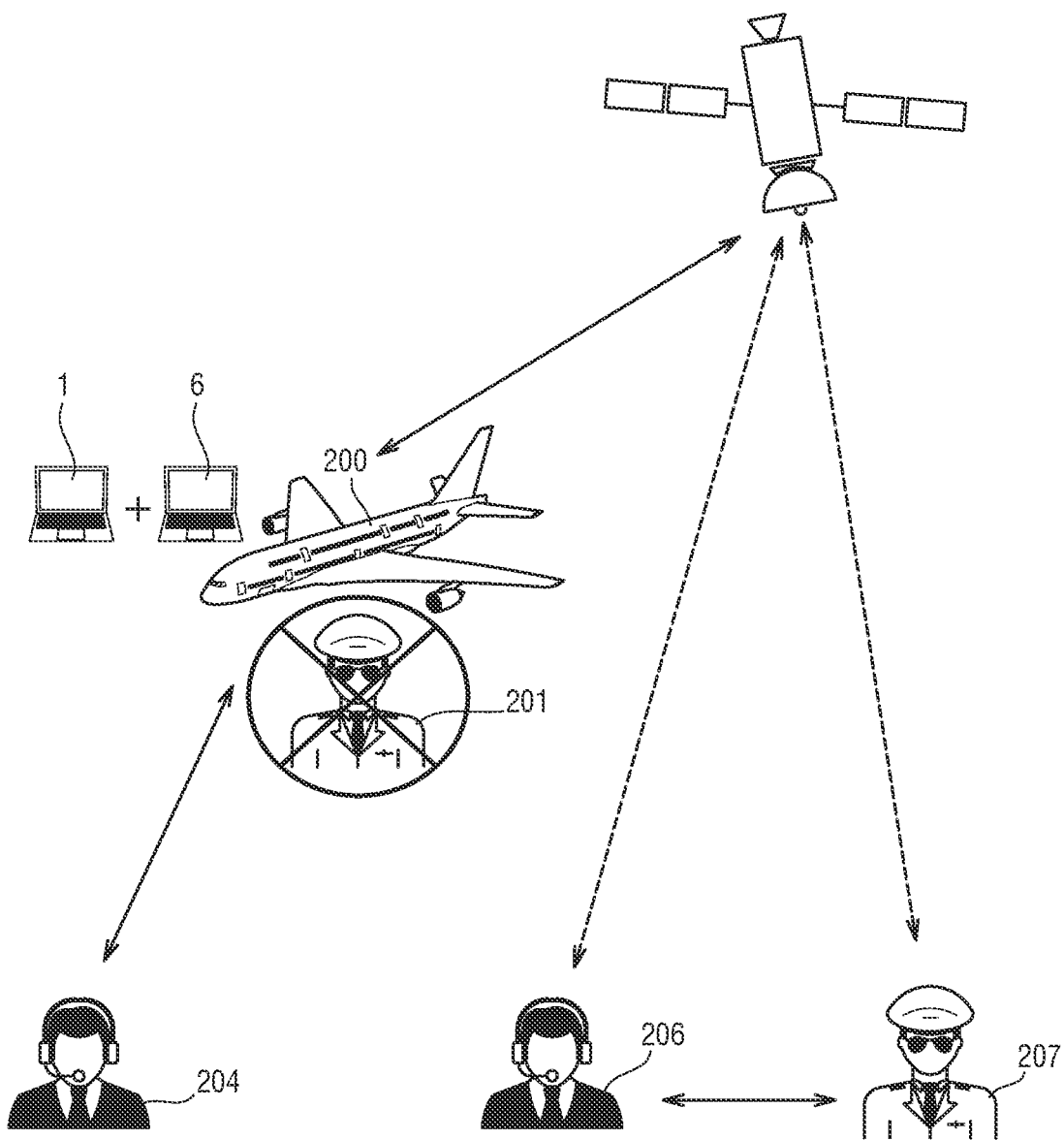
FIG. 6 represents air traffic control and the actors involved in piloting the aircraft in a transitional situation.

With reference to FIG. 6, when the occurrence of the particular emergency situation is detected, this information is transmitted to the ground supervisor 206 via the system data link C2. The flight situation is then a transitional situation. Depending on the particular emergency situation, the pilot on board 201 may be completely relieved of all flight duties.

The ground supervisor 206 makes the ground pilot 207 operational: the ground supervisor 206 informs the ground pilot 207 of the situation and gives him/her the possibility to take over at least partially the flight control of the aircraft 200.

Figure 7:
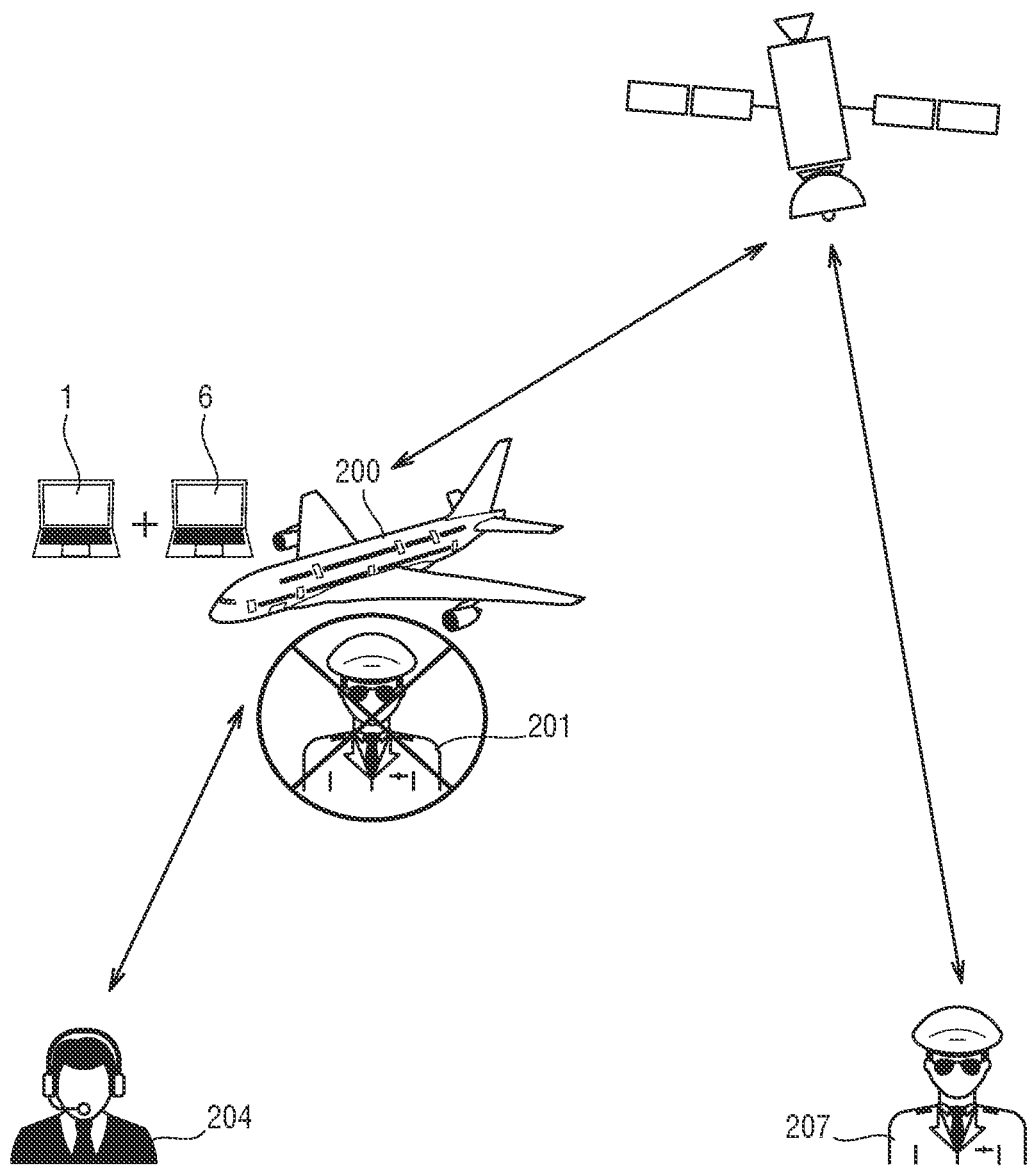
FIG. 7 represents air traffic control and the actors involved in piloting the aircraft in a situation where the pilot on board is not able to fly.

With reference to FIG. 7, the aircraft 200 is in an abnormal state. The flight situation is an abnormal situation. The aircraft 200 is piloted by an alternative crew consisting of the alternative flight system 1, the automatic control system 6 and the ground pilot 207.

The ground pilot 207 can produce an aircraft ground piloting setpoint. The ground piloting setpoint is transmitted to the aircraft 200 via the system data links C2.

The ground piloting setpoint is then acquired by the alternative control system 1. The acquisition and analysis device 30 selects a piloting setpoint selected from a manual piloting setpoint produced by the pilot on board, an automatic piloting setpoint produced by the automatic control system, the ground piloting setpoint produced by the ground pilot, and the alternative piloting setpoint produced by the control device 26. The interface device 34 transmits the selected piloting setpoint to the aircraft flight control system.

Figure 8:
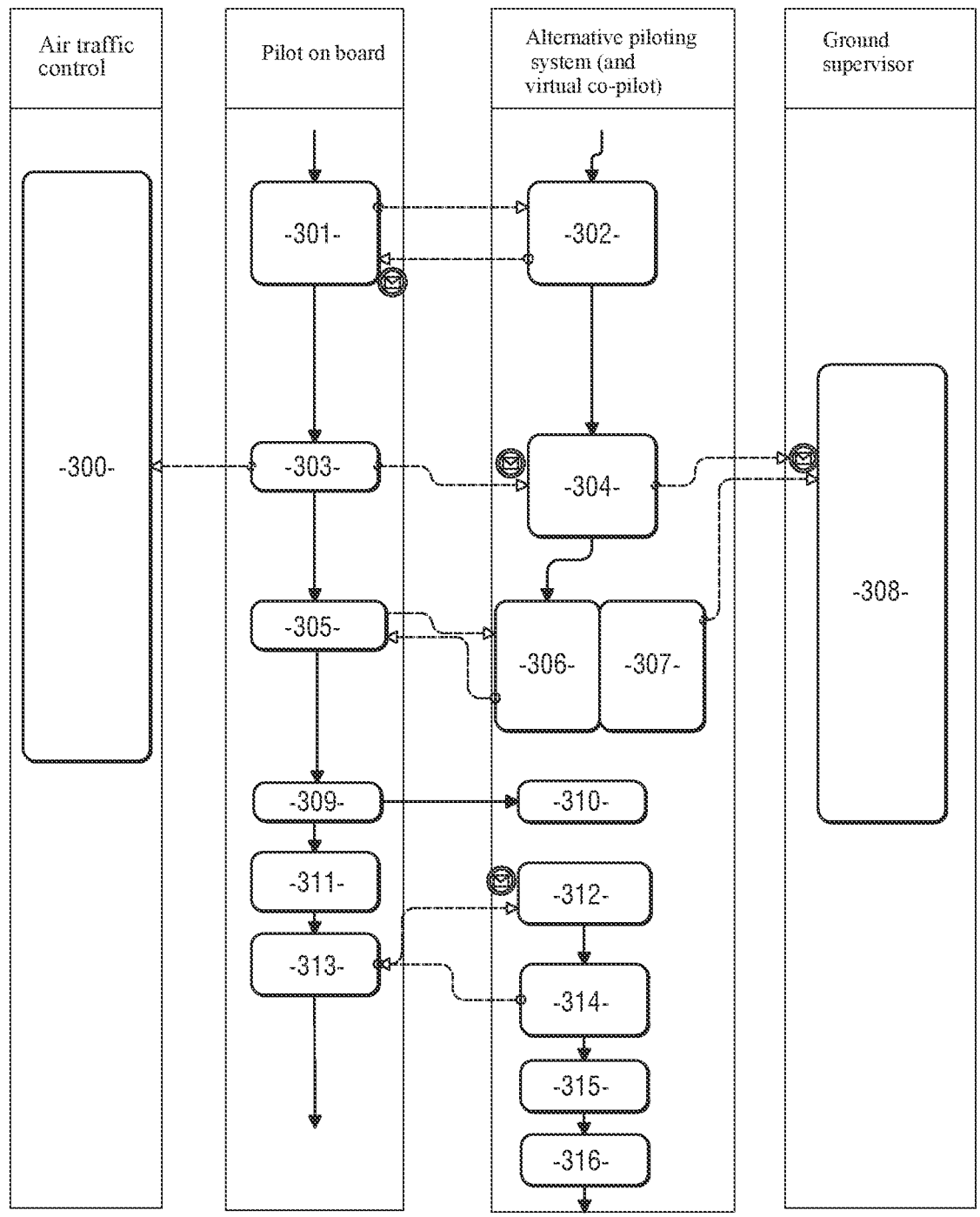
FIG. 8 represents a sequence of actions implemented during a take-off by a nominal crew.

With reference to FIG. 8, this is illustrated by a sequence of actions implemented by the nominal crew. This sequence of actions occurs during a take-off phase (which includes other actions occurring before and after said sequence of actions).

During this sequence of actions, air traffic control monitors take-off (step 300).

The pilot on board checks that the actions listed in a checklist are all performed (step 301). The alternative control system 1 also checks this checklist (step 302)

The pilot on board announces "take-off" (step 303). The alternative flight system 1 changes the status of the air-craft to "T/O" and transmits this information to the ground supervisor (step 304).

The pilot on board acts on the throttle to adjust the thrust (step 305). The alternative flight system 1 virtual co-pilot 52 announces to the pilot the change in the air-craft status (step 306) and transmits this information to the ground supervisor (step 307).

The ground supervisor monitors the status change and validates it (step 308).

The pilot on board releases the aircraft brakes (step 309). The alternative control system 1 starts a stopwatch (step 310).

The pilot set the throttle to TOGA (step 311). The alternative control system 1 checks the FMA (for Flight Mode Annunciator). The virtual co-pilot 52 announces "checked" (step 312).

The pilot on board announces the indication on the FMA (step 313). The alternative control system 1 checks the thrust of the reactors (step 314). The virtual co-pilot 52 announces that the speed of 100 knots has been reached (step 315). The virtual co-pilot 52 announces that the speed V1 has been reached (step 316).

Figure 9:
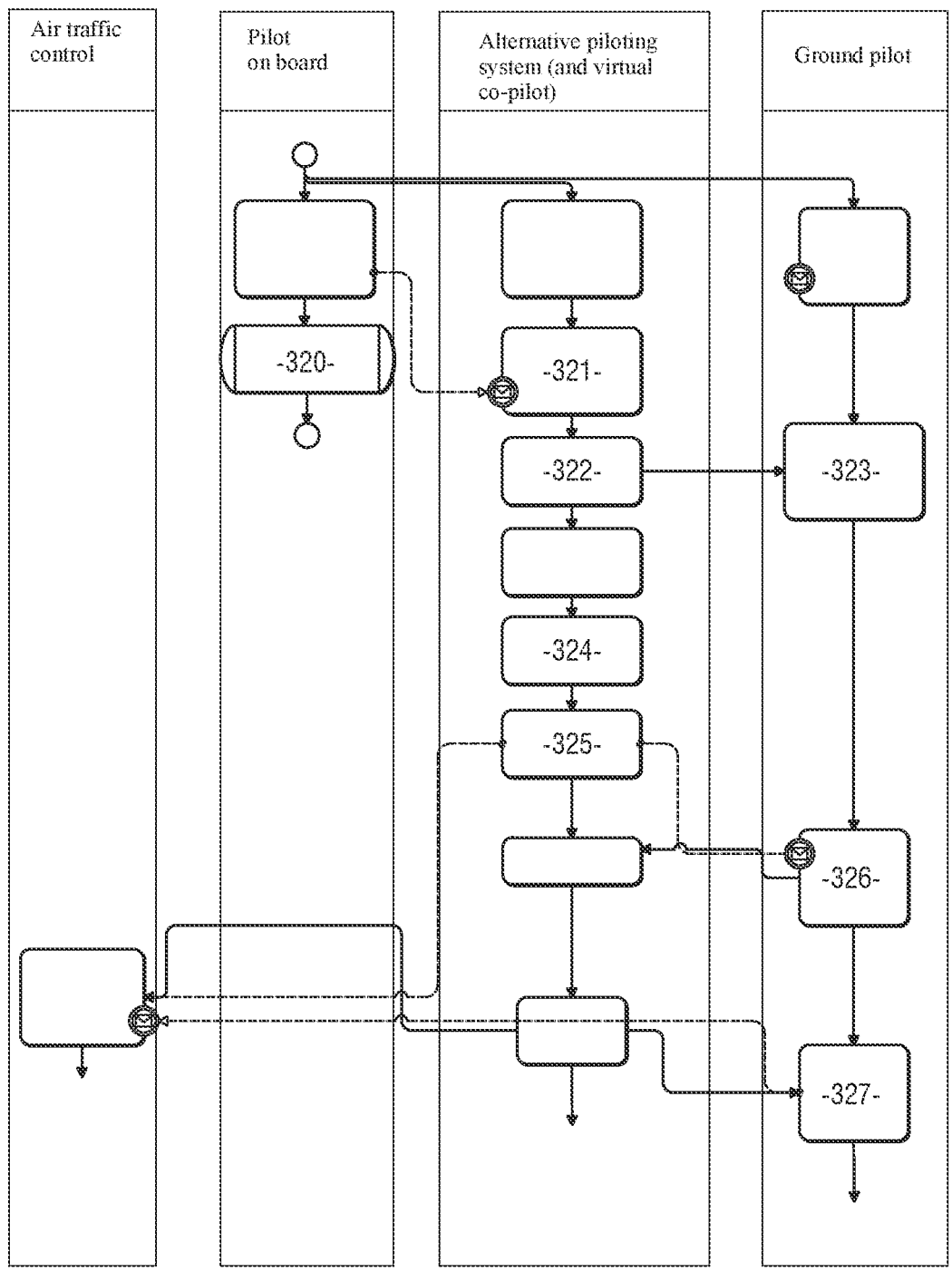
FIG. 9 represents a first sequence of actions implemented during a take-off by an alternative crew.
Figure 10:
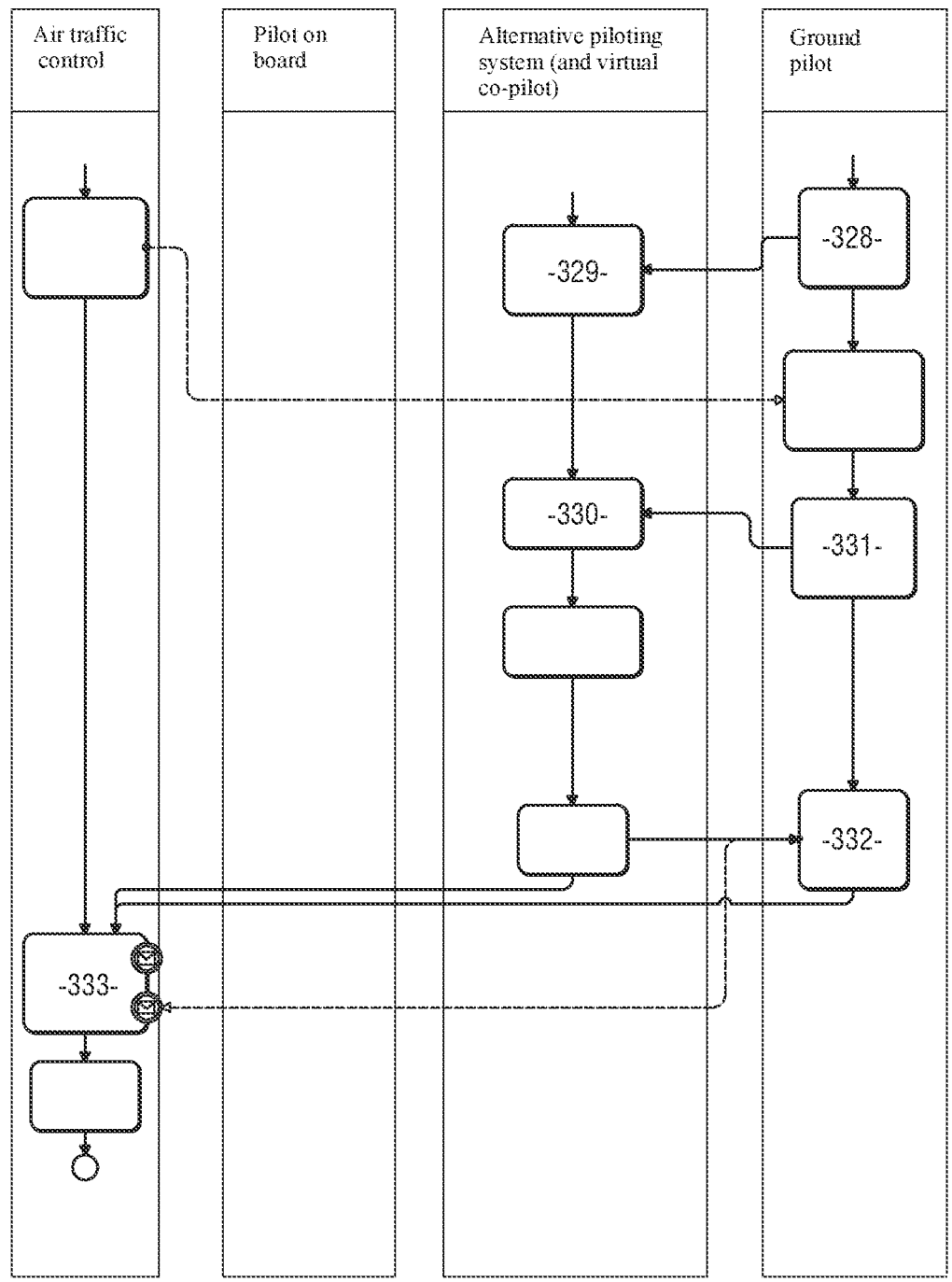
FIG. 10 represents a second sequence of actions implemented during take-off by the alternative crew.

With reference to FIGS. 9 and 10, what has just been said is illustrated by a sequence of actions implemented this time by the alternative crew. This sequence of actions occurs during a take-off phase, after the aircraft has exceeded the speed V1, when an incapacity of the pilot on board occurs (step 320). The alternative piloting system 1 and other systems monitor the activity of the pilot on board (step 321), and detect the incapacity of the pilot on board (step 322).

The pilot on board is relieved of any flight control action.

The virtual co-pilot 52 notifies the ground supervisor who makes the ground pilot operational. The ground pilot evaluates the situation (step 323).

The alternative flight system 1 keeps the aircraft on take-off (step 324), and activates the auto-take-off to about 100 feet (step 325), then the automatic flight control system 6 takes over. The ground pilot monitors the auto-take-off and prepares to take control of the aircraft (step 326). The ground pilot contacts air traffic control (step 327). The ground pilot takes control of the aircraft (step 328). The virtual co-pilot ensures that the aircraft is piloting at a safe altitude (step 329). The virtual co-pilot prepares for the implementation of an automatic landing (step 330). The ground pilot produces the ground piloting setpoint for the aircraft to make this landing (step 331). The ground pilot contacts air traffic control (step 332) who sends medical assistance to take care of the pilot on board (step 333).

Of course, the invention is not limited to the described embodiment but encompasses any alternative solution within the scope of the invention as defined in the claims.

The invention applies to any type of aircrafts, and particularly to aircrafts in which a single pilot is likely to be present: freight aircraft piloted by a single pilot, passenger aircraft piloted by a single pilot, urban taxi piloted by a single pilot, etc.

The invention claimed is:

1. A method for piloting a pre-existing aircraft operated by multiple pilots on board the pre-existing aircraft, the pre-existing aircraft comprising original systems comprising an automatic control system and a flight control system, the piloting method comprising converting the pre-existing aircraft into an aircraft configured to be piloted by a single pilot on the board the aircraft, said converting comprising:
   integrating an alternative piloting system into the pre-existing aircraft;
   connecting, through a command and control system (system C2), the aircraft and a ground station in which a ground pilot is positioned;
   when the aircraft is in a normal state, having the aircraft piloted by a nominal crew comprising the single pilot on board the aircraft, the alternative piloting system and the automatic control system, which are integrated into the aircraft; and
   using detection means to detect the occurrence of a particular emergency situation that may affect the operation of the aircraft and, when the occurrence of the particular emergency situation is detected:
      making the ground pilot operational, so that the ground pilot can produce a ground piloting setpoint of the aircraft;
      transmitting the ground piloting setpoint to the aircraft using a data link of system C2; and
      using the alternative piloting system to acquire and transmit the ground piloting setpoint to the aircraft flight control system, so that the aircraft is piloted by an alternative crew comprising the alternative piloting system, the automatic control system and the ground pilot.

2. The method for piloting an aircraft according to claim 1, wherein the ground pilot is made operational by a ground supervisor who is in charge of supervising a plurality of aircrafts.

3. The method for piloting an aircraft according to claim 2, comprising informing the ground supervisor of the occurrence of the particular emergency situation using the data link(s) of the system C2.

4. The method for piloting an aircraft according to claim 1, wherein at least one primary data link and one secondary data link of the system C2 are used, the secondary data link allowing the primary data link to be redundant and the primary data link to be supplemented in the event of its loss.

5. The method for piloting an aircraft according to claim 4, wherein, depending on the current flight phase of the aircraft, the primary data link is an LOS link and the secondary data link is a BLOS link, or the primary data link is a BLOS link and the secondary data link is an LOS link, or the primary data link is a first BLOS link and the secondary data link is a second BLOS link.

6. The method for piloting an aircraft according to claim 1, wherein the particular emergency situation belongs to a predefined list of emergency situations, which includes incapacity of the pilot on board, a risk of malicious act by the pilot on board and a failure of an engine.

7. The method for piloting an aircraft according to claim 6, wherein the detection means includes a voice assistance system used to detect a level of stress of the pilot on board that may indicate that the condition of a pilot on board is incompatible with a proper conduct of a flight.

8. The method for piloting an aircraft according to claim 6, wherein the detection means analyses an aircraft trajectory to detect a risk of malicious act by the pilot on board.

9. The method for piloting an aircraft according to claim 1, further comprising, implemented by the alternative piloting system:
   defining a piloting setpoint selected from a manual piloting setpoint produced by the pilot on board, an automatic piloting setpoint produced by the automatic control system, the ground piloting setpoint produced by the ground pilot, and an alternative piloting setpoint produced by the alternative piloting system; and
   transmitting the selected piloting setpoint to the flight control system of the aircraft.

* * * * *